US012602195B2

(12) United States Patent
Ding et al.

(10) Patent No.: US 12,602,195 B2
(45) Date of Patent: Apr. 14, 2026

(54) METHOD AND APPARATUS FOR CONTROLLING DEVICE BASED ON TAPPING AND STORAGE MEDIUM

(71) Applicants: QINGDAO HAIER WASHING MACHINE CO., LTD., Qingdao (CN); Haier Smart Home Co., Ltd., Qingdao (CN)

(72) Inventors: Xiaopeng Ding, Qingdao (CN); Zhenxing Huang, Qingdao (CN); Sheng Xu, Qingdao (CN)

(73) Assignees: Haier Smart Home Co., Ltd., Qingdao (CN); QINGDAO HAIER WASHING MACHINE CO., LTD., Qingdao (CN)

( * ) Notice: Subject to any disclaimer, the term of this patent is extended or adjusted under 35 U.S.C. 154(b) by 0 days.

(21) Appl. No.: 18/830,252

(22) Filed: Sep. 10, 2024

(65) Prior Publication Data

US 2024/0427550 A1 Dec. 26, 2024

Related U.S. Application Data

(63) Continuation of application No. PCT/CN2023/079930, filed on Mar. 6, 2023.

(30) Foreign Application Priority Data

Mar. 11, 2022 (CN) .......................... 202210242949.7

(51) Int. Cl.
G06F 3/16 (2006.01)

(52) U.S. Cl.
CPC ...................................... G06F 3/16 (2013.01)

(58) Field of Classification Search
CPC . G06F 3/16; G06F 3/017; G06F 3/043; G06F 3/167; G06F 2200/1636; G10L 25/30; G10L 25/05
See application file for complete search history.

(56) References Cited

U.S. PATENT DOCUMENTS

| | | | |
|---|---|---|---|
| 2016/0299621 A1 | 10/2016 | Sah et al. | |
| 2019/0175077 A1 | 6/2019 | Zhang et al. | |
| 2024/0353255 A1* | 10/2024 | Lu ........................ | G06N 3/0464 |

FOREIGN PATENT DOCUMENTS

| | | |
|---|---|---|
| CN | 106847283 A | 6/2017 |
| CN | 109872713 A | 6/2019 |

(Continued)

OTHER PUBLICATIONS

PCT International Search Report for International Application No. PCT/CN2023/079930 dated May 24, 2023.

(Continued)

*Primary Examiner* — Priyank J Shah
(74) *Attorney, Agent, or Firm* — Quarles & Brady LLP

(57) ABSTRACT

The present application provides a method and apparatus for controlling a device based on tapping and a storage medium. The method includes: in response to a tapping action from a user, acquiring sound information triggered by the tapping action; performing recognition processing on the sound information according to a preset recognition model set to determine a recognition result of the sound information, where the recognition model set includes at least one recognition model; and controlling the device according to the recognition result. No components needs to be added for the method, application limitations of the method no longer exist, and the diverse control of the device can be realized.

18 Claims, 4 Drawing Sheets

(56)        References Cited

FOREIGN PATENT DOCUMENTS

| | | | |
|----|------------|---|---------|
| CN | 110335456 | A | 10/2019 |
| CN | 111429942 | A | 7/2020 |
| CN | 111809357 | A | 10/2020 |
| CN | 112524651 | A | 3/2021 |
| CN | 113349462 | A | 9/2021 |
| CN | 113864995 | A | 12/2021 |
| GB | 2507243 | A | 4/2014 |

OTHER PUBLICATIONS

European Search Report for European Application No. 23765960.2; dated May 27, 2025; 8 pages.

* cited by examiner

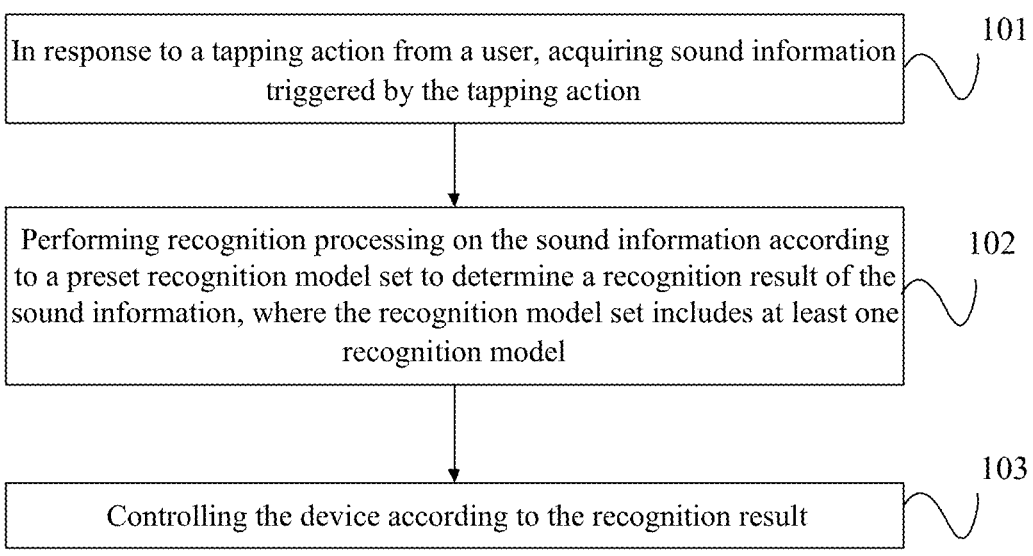

In response to a tapping action from a user, acquiring sound information triggered by the tapping action                                                                101

Performing recognition processing on the sound information according to a preset recognition model set to determine a recognition result of the sound information, where the recognition model set includes at least one recognition model                                                                102

Controlling the device according to the recognition result                                                                103

FIG. 1

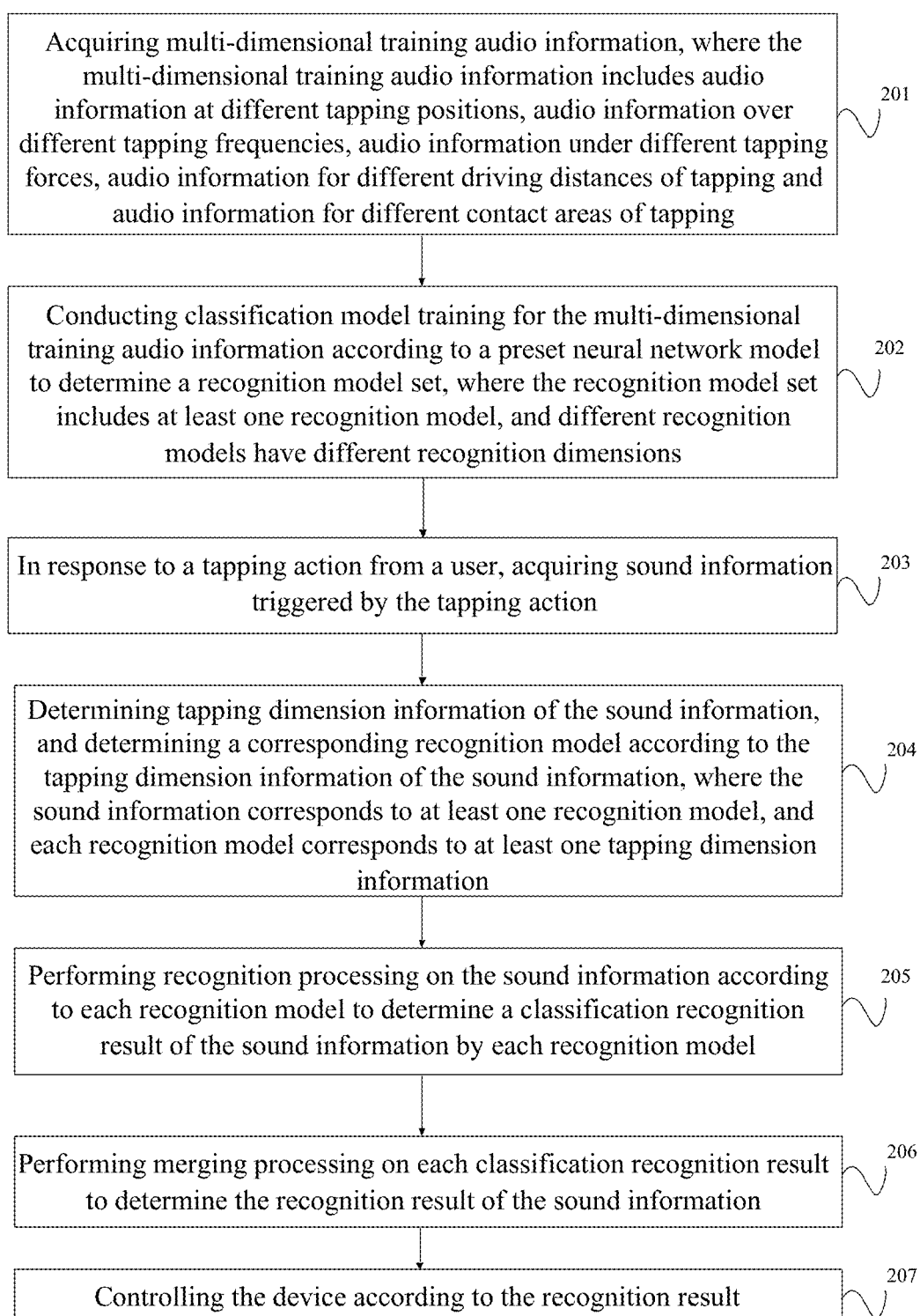

Acquiring multi-dimensional training audio information, where the multi-dimensional training audio information includes audio information at different tapping positions, audio information over different tapping frequencies, audio information under different tapping forces, audio information for different driving distances of tapping and audio information for different contact areas of tapping — 201

Conducting classification model training for the multi-dimensional training audio information according to a preset neural network model to determine a recognition model set, where the recognition model set includes at least one recognition model, and different recognition models have different recognition dimensions — 202

In response to a tapping action from a user, acquiring sound information triggered by the tapping action — 203

Determining tapping dimension information of the sound information, and determining a corresponding recognition model according to the tapping dimension information of the sound information, where the sound information corresponds to at least one recognition model, and each recognition model corresponds to at least one tapping dimension information — 204

Performing recognition processing on the sound information according to each recognition model to determine a classification recognition result of the sound information by each recognition model — 205

Performing merging processing on each classification recognition result to determine the recognition result of the sound information — 206

Controlling the device according to the recognition result — 207

FIG. 2

METHOD AND APPARATUS FOR CONTROLLING DEVICE BASED ON TAPPING AND STORAGE MEDIUM

CROSS-REFERENCE TO RELATED APPLICATION

This application is a continuation of International Application No. PCT/CN2023/079930, filed on Mar. 6, 2023, which claims priority to Chinese patent application No. 2022102429497, filed on Mar. 11, 2022, both of which are hereby incorporated by reference in their entireties.

TECHNICAL FIELD

The present application relates to the field of intelligence interaction and, in particular, to a method and apparatus for controlling a device based on tapping and a storage medium.

BACKGROUND

At present, application scenarios of smart devices are becoming more and more extensive, such as smart washing machines, smart phones, wearable devices, smart homes and so on. Subsequently, ways of intelligent interaction with smart devices are gradually diversified. Among them, controlling smart devices by tapping on the device is a simple and more convenient way of intelligent interaction.

In prior art, a piezoelectric sensor is used to sense changes of high and low levels caused by a user when tapping on the device, thereby determining whether a tapping rhythm conforms to a preset logic for device control.

However, in the prior art, the piezoelectric sensor needs to be arranged in an area where the user will tap, which has application limitations and undiversified function, and lacks the capability for diverse control of the device.

SUMMARY

The present application provides a method and apparatus for controlling a device based on tapping and a storage medium, to solve the problem that control of device based on tapping has an undiversified function and application limitations, and lacks the capability for diverse control of the device.

In a first aspect, the present application provides a method for controlling a device based on tapping, the method includes:

in response to a tapping action from a user, acquiring sound information triggered by the tapping action;

performing recognition processing on the sound information according to a preset recognition model set to determine a recognition result of the sound information, where the recognition model set includes at least one recognition model;

controlling the device according to the recognition result.

In an optional implementation, the performing recognition processing on the sound information according to a preset recognition model set to determine a recognition result of the sound information includes:

determining tapping dimension information of the sound information;

determining a corresponding recognition model according to the tapping dimension information of the sound information, and performing recognition processing on the sound information according to each recognition model to determine a classification recognition result of the sound information by each recognition model, where the sound information corresponds to at least one recognition model, and each recognition model corresponds to at least one tapping dimension information;

performing merging processing on each classification recognition result to determine the recognition result of the sound information.

In an optional implementation, the performing recognition processing on the sound information according to each recognition model to determine a classification recognition result of the sound information by each recognition model includes:

performing recognition processing on the sound information according to each recognition model to determine a confidence rate of the sound information under each recognition model, where the confidence rate represents a probability of the sound information being recognized by a recognition model;

if the confidence rate is greater than or equal to a preset threshold, determining a classification recognition result of the sound information from the corresponding recognition model to be that the sound information passes recognition;

if the confidence rate is less than a preset threshold, determining a classification recognition result of the sound information from the corresponding recognition model to be that the sound information does not pass recognition.

In an optional implementation, the tapping dimension information includes one or more of tapping frequency information, tapping force information, tapping position information, information about a driving distance of tapping and information about a contact area of tapping.

In an optional implementation, the controlling the device according to the recognition result includes:

if the recognition result indicates that the sound information does not pass a recognition by any recognition model, controlling the device to output prompting information, where the prompting information is used for prompting the user to reenter a tapping action;

if the recognition result indicates that the sound information passes a recognition by one or more recognition models, outputting a control instruction according to the recognition result, and controlling the device to execute the corresponding control instruction, where the control instruction is used for controlling the device to perform one or more of starting up, shutting down, intelligent interaction, door opening and door closing.

In an optional implementation, the method further includes:

acquiring multi-dimensional training audio information, where the multi-dimensional training audio information includes audio information at different tapping positions, audio information over different tapping frequencies, audio information under different tapping forces, audio information for different driving distances of tapping and audio information for different contact areas of tapping;

conducting classification model training for the multi-dimensional training audio information according to a preset neural network model to determine the recognition model set, where different recognition models have different recognition dimensions.

In a second aspect, the present application provides an apparatus for controlling a device based on tapping, the apparatus includes:

a first acquiring unit, configured to acquire sound information triggered by a tapping action in response to the tapping action from a user;

a first processing unit, configured to perform recognition processing on the sound information according to a preset recognition model set to determine a recognition result of the sound information, where the recognition model set includes at least one recognition model;

a second processing unit, configured to control the device according to the recognition result.

In an optional implementation, the first processing unit includes:

a determining subunit, configured to determine tapping dimension information of the sound information;

a first processing subunit, configured to determine a corresponding recognition model according to the tapping dimension information of the sound information, and perform recognition processing on the sound information according to each recognition model to determine a classification recognition result of the sound information by each recognition model, where the sound information corresponds to at least one recognition model, and each recognition model corresponds to at least one tapping dimension information;

a second processing subunit, configured to perform merging processing on each classification recognition result to determine the recognition result of the sound information.

In an optional implementation, the first processing subunit is configured to:

perform recognition processing on the sound information according to each recognition model to determine a confidence rate of the sound information under each recognition model, where the confidence rate represents a probability of the sound information being recognized by a recognition model;

if the confidence rate is greater than or equal to a preset threshold, determine a classification recognition result of the sound information from the corresponding recognition model to be that the sound information passes recognition;

if the confidence rate is less than a preset threshold, determine a classification recognition result of the sound information from the corresponding recognition model to be that the sound information does not pass recognition.

In an optional implementation, the tapping dimension information includes one or more of tapping frequency information, tapping force information, tapping position information, information about a driving distance of tapping and information about a contact area of tapping.

In an optional implementation, the second processing unit includes:

a third processing subunit, configured to: if the recognition result indicates that the sound information does not pass a recognition by any recognition model, control the device to output prompting information, where the prompting information is used for prompting the user to reenter a tapping action;

a fourth processing subunit, configured to: if the recognition result indicates that the sound information passes a recognition by one or more recognition models, output a control instruction according to the recognition result, and control the device to execute the corresponding control instruction, where the control instruction is used for controlling the device to perform one or more of starting up, shutting down, intelligent interaction, door opening and door closing.

In an optional implementation, the apparatus further includes:

a second acquiring unit, configured to acquire multi-dimensional training audio information, where the multi-dimensional training audio information includes audio information at different tapping positions, audio information over different tapping frequencies, audio information under different tapping forces, audio information for different driving distances of tapping and audio information for different contact areas of tapping;

a determining unit, configured to conduct classification model training for the multi-dimensional training audio information according to a preset neural network model to determine the recognition model set, where different recognition models have different recognition dimensions.

In a third aspect, the present application provides a computer readable storage medium, the computer readable storage medium is stored with a computer executable instruction, where when the computer executable instruction is executed by a processor, the method as described in the above first aspect is implemented.

In a fourth aspect, the present application provides a computer program product including a computer program, where when the computer program is executed by a processor, the method as described in the above first aspect is implemented.

According to the method and apparatus for controlling a device based on tapping and the storage medium provided in the present application, sound information triggered by a tapping action is acquired in response to the tapping action from a user, recognition processing is performed on the sound information according to a preset recognition model set to determine a recognition result of the sound information, where the recognition model set includes at least one recognition model, and the device is controlled according to the recognition result. No components needs to be added for the method, application limitations of the method no longer exist, and the diverse control of the device can be realized.

BRIEF DESCRIPTION OF DRAWINGS

The drawings herein are incorporated into and form a part of the present specification, they show embodiments that comply with the present application, and are used to explain the principle of the present application with the specification together.

FIG. 1 is a flowchart of a method for controlling a device based on tapping provided by an embodiment of the present application.

FIG. 2 is flowchart of another method for controlling a device based on tapping provided by an embodiment of the present application.

Figure 3:
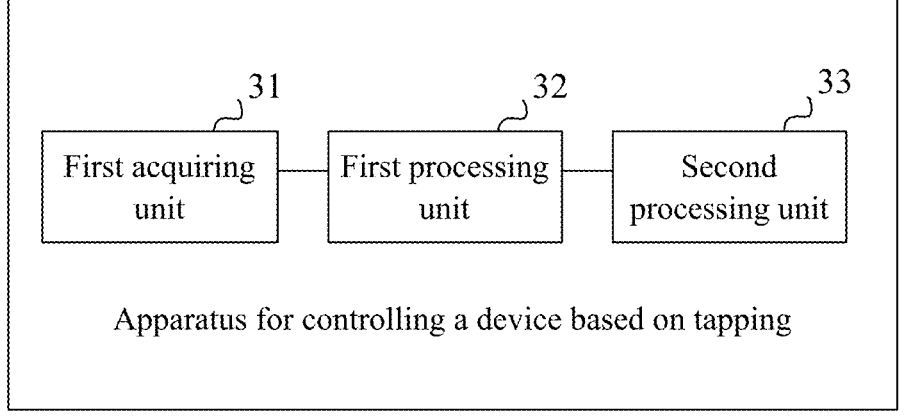
FIG. 3 is a structural diagram of an apparatus for controlling a device based on tapping provided by an embodiment of the present application.

Clear embodiments of the present application have been shown by the drawings above and will be described in more detail there-in-after. These drawings and text descriptions are not intended in any way to limit the scope of conceptions presented in the present application, but rather to illustrate concepts of the present application for those skilled in the art by reference to specific embodiments.

DESCRIPTION OF EMBODIMENTS

Exemplary embodiments will be illustrated in detail here, examples of which are shown in appended figures. When the description below relates to drawings, the same numbers in different drawings represent the same or similar elements unless otherwise indicated. The embodiments described in the following exemplary embodiments do not represent all embodiments consistent with the present application. On the contrary, they are merely examples of apparatuses and methods that are consistent with some aspects of the present application as detailed in the appended claims.

At present, application scenarios of smart devices are becoming more and more extensive, such as smart washing machines, smart phones, intelligent wearable devices, smart homes and so on. Subsequently, ways of intelligent interaction with smart devices are gradually diversified. Among them, controlling smart devices by tapping on the device is a simple and more convenient way of intelligent interaction.

In the prior art, as a way of intelligent interaction based on tapping, a piezoelectric sensor is used to sense changes of high and low levels caused by a user when tapping on the device, thereby determining whether a tapping rhythm conforms to a preset logic for device control, such as opening a door of a smart washing machine, closing a door of a smart washing machine, starting up of a smart washing machine, shutting down of a smart washing machine, etc.

However, in the prior art, the piezoelectric sensor needs to be arranged in an area where the user will tap, otherwise device control cannot be realized, and the device control function that can be achieved by tapping is relatively simple, the diverse control of the device cannot be achieved.

A method for controlling a device based on tapping provided in the present application is intended to solve the above technical problems of the prior art.

The followings are specific embodiments of technical solutions of the present application and how the technical solutions of the present application solve the above technical problems in detail. The following specific embodiments may be combined with each other, and the same or similar concepts or processes may not be repeated in some embodiments. Embodiments of the present application will be described below in combination with the appended drawings.

FIG. 1 is a flowchart of a method for controlling a device based on tapping provided by an embodiment of the present application, as shown in FIG. 1, the method includes:

101, in response to a tapping action from a user, acquiring sound information triggered by the tapping action.

Exemplary, when a user taps on a device, the device generates sound information under the user's tapping action, based on a voice recognition component in the device, the sound information triggered by the tapping action is acquired in real time. When the user knocks at different positions of the device, or when the user knocks with different intensity or frequencies, the triggered sound information of the device is different.

102, performing recognition processing on the sound information according to a preset recognition model set to determine a recognition result of the sound information, where the recognition model set includes at least one recognition model.

Exemplary, recognition processing is performed on the sound information according to one or more recognition models in the recognition model set pre-stored in the device, to determine the validity of the sound information and determine the recognition result of the sound information.

103, controlling the device according to the recognition result.

Exemplary, it is determined whether the sound information has passed the recognition by the recognition model according to the recognition result of the sound information from the recognition model. If the sound information has passed the recognition, the built-in voice monitoring component of the device will issue a control instruction corresponding to the sound information based on a preset control logic to control the device, if the sound information has failed to pass the recognition, the built-in voice monitoring component of the device will control the device to output prompt information to remind the user to re-tap. Different sound information corresponds to different control instructions, so as to control the device to perform different actions.

In the present embodiment, through the following steps: in response to a tapping action from a user, acquiring sound information triggered by the tapping action; performing recognition processing on the sound information according to a preset recognition model set to determine a recognition result of the sound information, where the recognition model set includes at least one recognition model; and controlling the device according to the recognition result. No components needs to be added for the method, application limitations of the method no longer exist, and the diverse control of the device can be realized.

FIG. 2 is flowchart of another method for controlling a device based on tapping provided by an embodiment of the present application, as shown in FIG. 2, the method includes:

201, acquiring multi-dimensional training audio information, where the multi-dimensional training audio information includes audio information at different tapping positions, audio information over different tapping frequencies, audio information under different tapping forces, audio information for different driving distances of tapping and audio information for different contact areas of tapping.

Exemplary, based on a voice interaction component on the device, the audio information at different tapping positions, the audio information over different tapping frequencies, the audio information under different tapping forces, the audio information for different driving distances of tapping and the audio information for different contact areas of tapping are collected to acquire the multi-dimensional training audio information in different tapping dimensions.

202, conducting classification model training for the multi-dimensional training audio information according to a preset neural network model to determine a recognition model set, where the recognition model set includes at least one recognition model, and different recognition models have different recognition dimensions.

Exemplary, classification model training is performed on the multi-dimensional training audio information according to the preset neural network model, to determine the recognition model set, where the recognition model set includes at least one recognition model, and different recognition models have different recognition dimensions. The audio information with one or more tapping dimensions trains a recognition model with a recognize dimension.

203, in response to a tapping action from a user, acquiring sound information triggered by the tapping action.

Exemplary, reference can be made to step 101 for this step, and details will not be given for brevity.

When a user taps on a device, the device generates sound information under the user's tapping action, based on a voice recognition component in the device, the sound information triggered by the tapping action is acquired in real time. When the user knocks at different positions of the device, or when the user knocks with different intensity or frequencies, the triggered sound information of the device is different.

204, determining tapping dimension information of the sound information, and determining a corresponding recognition model according to the tapping dimension information of the sound information, where the sound information corresponds to at least one recognition model, and each recognition model corresponds to at least one tapping dimension information.

In an example, the tapping dimension information includes one or more of tapping frequency information, tapping force information, tapping position information, information about a driving distance of tapping and information about a contact area of tapping.

Exemplary, the sound information includes tapping dimension information of the tapping action that triggered the sound information, such as one or more of tapping frequency information, tapping force information, tapping position information, information about a driving distance of tapping and information about a contact area of tapping. Determining tapping dimension information of the sound information, and determining one or more corresponding recognition models according to the tapping dimension information of the sound information, that is, one piece of sound information can be subject to recognition processing of one recognition model, or can also be subject to recognition processing of several recognition models, each recognition model corresponds to at least one tapping dimension information, different recognition models correspond to different tapping dimension information, for example, sound information that can be recognized by different recognition models has different tapping frequencies, different tapping forces, different tapping positions, etc.

205, performing recognition processing on the sound information according to each recognition model to determine a classification recognition result of the sound information by each recognition model.

In an example, step 205 includes the following steps:

performing recognition processing on the sound information according to each recognition model to determine a confidence rate of the sound information under each recognition model, where the confidence rate represents a probability of the sound information being recognized by a recognition model;

if the confidence rate is greater than or equal to a preset threshold, determining a classification recognition result of the sound information from the corresponding recognition model to be that the sound information passes recognition;

if the confidence rate is less than a preset threshold, determining a classification recognition result of the sound information from the corresponding recognition model to be that the sound information does not pass recognition.

Exemplary, recognition processing is performed on the sound information according to each recognition model of one or more recognition models corresponding to the sound information, a confidence rate of the sound information under each recognition model is determined, if the confidence rate is greater than or equal to a preset threshold, a classification recognition result of the sound information from the corresponding recognition model is determined to be that the sound information passes recognition; if the confidence rate is less than a preset threshold, a classification recognition result of the sound information from the corresponding recognition model is determined to be that the sound information does not pass recognition, where the confidence rate represents a probability of the sound information being recognized by a recognition model.

206, performing merging processing on each classification recognition result to determine the recognition result of the sound information.

Exemplary, classification recognition results of the sound information from respective recognition models corresponding to the sound information are determined respectively, and they undergo the merging processing, further the recognition result of the sound information is determined.

207, controlling the device according to the recognition result.

In an example, step 207 includes the following steps:

if the recognition result indicates that the sound information does not pass a recognition by any recognition model, controlling the device to output prompting information, where the prompting information is used for prompting the user to reenter a tapping action;

if the recognition result indicates that the sound information passes a recognition by one or more recognition models, outputting a control instruction according to the recognition result, and controlling the device to execute the corresponding control instruction, where the control instruction is used for controlling the device to perform one or more of starting up, shutting down, intelligent interaction, door opening and door closing.

Exemplary, if the recognition result indicates that the sound information has not passed a recognition by any recognition model, the device is controlled to output prompting information, where the prompting information is used for prompting the user to reenter a tapping action; if the recognition result indicates that the sound information has passed a recognition by one or more recognition models, a control instruction is output according to the recognition result, and the device is controlled to execute the corresponding control instruction, where the control instruction is used for controlling the device to perform one or more of starting up, shutting down, intelligent interaction, door opening and door closing.

In an example, when a tapping action from a user acts on a smart device, such as a smart washing machine, the user taps a door of the washing machine cylinder with a certain tapping force at a certain tapping frequency, the tapping dimension information of the sound information includes tapping force information and tapping position information, and the sound information corresponds to two preset recognition models, where one recognition model recognizes the tapping force information and tapping frequency information in the sound information, and the other recognition model recognizes the tapping position information in the sound information. If the recognition result indicates that the sound information has passed the recognition of these two recognition models, a control instruction is output to control the smart washing machine to start up and open the cylinder door. If the recognition result indicates that the sound information has passed the recognition of the recognition model which recognizes the tapping force information and tapping frequency information in the sound information, a control instruction is output to control the smart washing machine to start up; if the recognition result indicates that the sound information has passed the recognition of the recognition model which recognizes the tapping position information in the sound information, a control instruction is output to control the washing machine to open the cylinder door.

In the present embodiment, the multi-dimensional audio information collected is trained by the preset neural network model, and recognition models for multiple dimensions are determined; one or more recognition models corresponding to the sound information are determined according to the dimension information of the sound information; recognition processing is performed on the sound information according to the recognition model to determine a classification recognition result of the sound information by each recognition model, and then a recognition result of the sound information is obtained, the device is controlled, according to different recognition results, to output prompt information or execute the corresponding control instruction. During this process, recognition models for different recognition dimensions are used, according to the tapping dimension information of the sound information, to realize classified recognition and control, thus achieving diverse and differentiated flexible control of the device.

FIG. 3 is a structural diagram of an apparatus for controlling a device based on tapping provided by an embodiment of the present application, as shown in FIG. 3, the apparatus includes:

a first acquiring unit 31, configured to acquire sound information triggered by a tapping action in response to the tapping action from a user;

a first processing unit 32, configured to perform recognition processing on the sound information according to a preset recognition model set to determine a recognition result of the sound information, where the recognition model set includes at least one recognition model;

a second processing unit 33, configured to control the device according to the recognition result.

Figure 4:
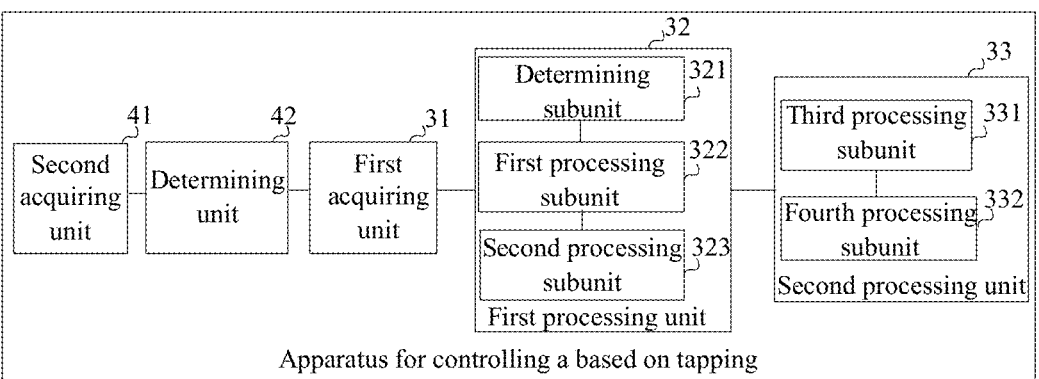
FIG. 4 is a structural diagram of another apparatus for controlling a device based on tapping provided by an embodiment of the present application.

FIG. 4 is a structural diagram of another apparatus for controlling a device based on tapping provided by an embodiment of the present application, on the basis of the embodiment shown in FIG. 3, the apparatus includes the following.

In an example, the first processing unit 32 includes:

a determining subunit 321, configured to determine tapping dimension information of the sound information;

a first processing subunit 322, configured to determine a corresponding recognition model according to the tapping dimension information of the sound information, and perform recognition processing on the sound information according to each recognition model to determine a classification recognition result of the sound information by each recognition model, where the sound information corresponds to at least one recognition model, and each recognition model corresponds to at least one tapping dimension information;

a second processing subunit 323, configured to perform merging processing on each classification recognition result to determine the recognition result of the sound information.

In an example, the first processing subunit 322 is configured to:

perform recognition processing on the sound information according to each recognition model to determine a confidence rate of the sound information under each recognition model, where the confidence rate represents a probability of the sound information being recognized by a recognition model;

if the confidence rate is greater than or equal to a preset threshold, determine a classification recognition result of the sound information from the corresponding recognition model to be that the sound information passes recognition;

if the confidence rate is less than a preset threshold, determine a classification recognition result of the sound information from the corresponding recognition model to be that the sound information does not pass recognition.

In an example, the tapping dimension includes one or more of a tapping frequency, a tapping force, a tapping position, a driving distance of tapping and a contact area of tapping.

In an example, the second processing unit 33 includes:

a third processing subunit 331, configured to: if the recognition result indicates that the sound information does not pass a recognition by any recognition model, control the device to output prompting information, where the prompting information is used for prompting the user to reenter a tapping action;

a fourth processing subunit 332, configured to: if the recognition result indicates that the sound information passes a recognition by one or more recognition models, output a control instruction according to the recognition result, and control the device to execute the corresponding control instruction, where the control instruction is used for controlling the device to perform one or more of starting up, shutting down, intelligent interaction, door opening and door closing.

In an example, the apparatus further includes:

a second acquiring unit 41, configured to acquire multi-dimensional training audio information, where the multi-dimensional training audio information includes audio information at different tapping positions, audio information over different tapping frequencies, audio information under different tapping forces, audio information for different driving distances of tapping and audio information for different contact areas of tapping;

a determining unit 42, configured to conduct classification model training for the multi-dimensional training audio information according to a preset neural network model to determine the recognition model set, where different recognition models have different recognition dimensions.

Figure 5:
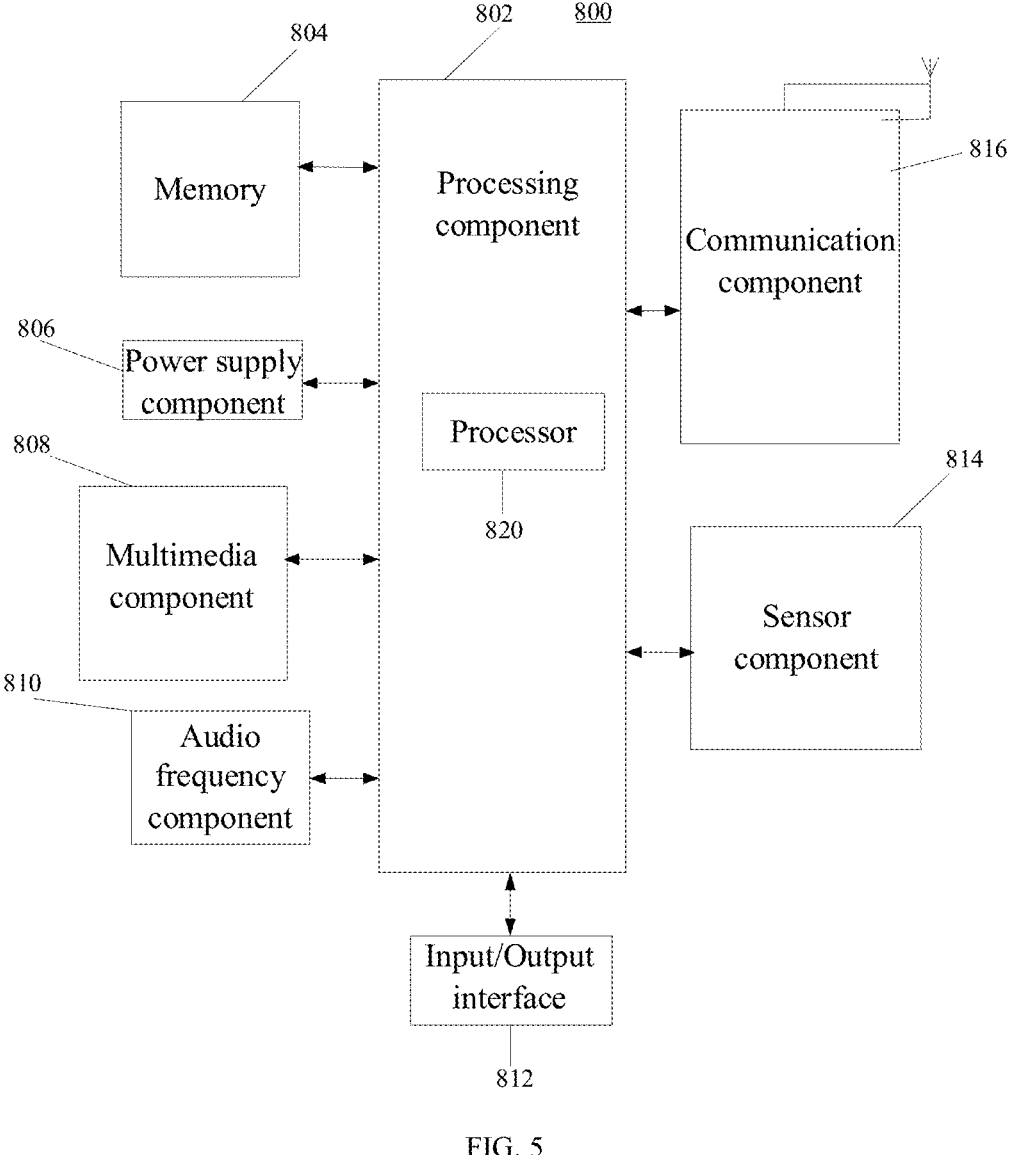
FIG. 5 is a block diagram of a terminal device shown according to an exemplary embodiment.

FIG. 5 is a block diagram of a terminal device shown according to an exemplary embodiment, the device may be a mobile phone, a computer, a digital broadcasting terminal, a messaging transceiving device, a game console, a tablet device, a medical device, a fitness device, a personal digital assistant, etc.

An apparatus 800 may include one or more of the following components: a processing component 802, a memory 804, a power supply component 806, a multimedia component 808, an audio component 810, an input/output (I/O) interface 812, a sensor component 814, and a communication component 816.

The processing component 802 usually controls the overall operation of the apparatus 800, such as those associated with display, telephone call, data communication, camera operation, and recording operation. The processing component 802 may include one or more processors 820 to execute instructions to complete all or part of the steps of the method described above. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various types of data to support operations by the apparatus 800. Examples of such data include instructions for any application or method operatable on the apparatus 800, contact data, phone book data, messages, pictures, videos, etc. The memory 804 can be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or CD.

The power supply component 806 provides power to the various components in the apparatus 800. The power supply component 806 may include a power management system, one or more power sources, and other components associated with generation, management, and distribution of power for the apparatus 800.

The multimedia component 808 includes a screen providing an output interface between the apparatus 800 and the user. In some embodiments, the screen may include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. Touch sensors can not only sense a boundary of a touch or slide action, but also detect the duration and pressure associated with the touch or slide operation. In some embodiments, the multimedia component 808 includes a front camera and/or rear camera. When the apparatus 800 is in an operation mode, such as a shooting mode or video mode, the front camera and/or rear camera can receive external multimedia data. Each front camera and rear camera can be a fixed optical lens system or have a focal length and optical zoom capabilities.

The audio component 810 is configured to output and/or input audio signals. For example, the audio component 810 includes a microphone (MIC) configured to receive external audio signals when the apparatus 800 is in operation modes such as call mode, record mode, and speech recognition mode. The received audio signal may be further stored in the memory 804 or transmitted via the communication component 816. In some embodiments, the audio component 810 also includes a speaker for outputting an audio signal.

The I/O interface 812 provides an interface between the processing component 802 and the peripheral interface module, which may be a keyboard, click wheel, button, etc. These buttons may include, but are not limited to: home button, volume button, start button, and lock button.

The sensor component 814 includes one or more sensors for providing condition assessment of various aspects to the apparatus 800. For example, the sensor component 814 can detect the on/off state of the apparatus 800, the relative positioning of the components (such as the display and small keyboard of the apparatus 800), the sensor component 814 can also detect the change of the position of the apparatus 800 or a component of the apparatus 800, the presence or absence of contact between the user and the apparatus 800, azimuth or acceleration/deceleration and temperature change of the apparatus 800. The sensor component 814 may include a proximity sensor configured to detect the presence of nearby objects in the absence of any physical contact. The sensor component 814 may also include a light sensor such as CMOS or CCD image sensor for use in imaging applications. In some embodiments, the sensor component 814 may also include an acceleration sensor, a gyroscope sensor, a magnetic sensor, a pressure sensor or a temperature sensor.

The communication component 816 is configured to facilitate wired or wireless communication between the apparatus 800 and other devices. The apparatus 800 can access wireless networks based on communication standards such as WiFi, 2G or 3G, or a combination thereof. In an exemplary embodiment, the communication component 816 receives broadcast signals or broadcast related information from an external broadcast management system via a broadcast channel. In an exemplary embodiment, the communication component 816 also includes a near-field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the apparatus 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components to execute the above method.

In an exemplary embodiment, a non-transitory computer readable storage medium with instructions is provided, such as the memory 804 with instructions that can be executed by the processor 820 in the apparatus 800 to accomplish the above method. For example, the non-transitory computer readable storage medium can be an ROM, a random access memory (RAM), a CD-ROM, a magnetic tape, a floppy disk, an optical data storage device, etc.

An embodiment of the present application also provides a non-transitory computer readable storage medium, when the instructions in the storage medium are executed by a processor of an electronic device, the electronic device is enabled to execute the method provided by the above embodiments.

An embodiment of the present application also provides a computer program product including a computer program, the computer program is stored in a readable storage medium, at least one processor of an electronic device may read the computer program from the readable storage medium, and the at least one processor executes the computer program to enable the electronic device to execute the method provided by any of the above embodiments.

Persons skilled in the art will readily think of other embodiments of the present application after considering the specifications and practicing the invention disclosed herein. The present application is intended to cover any variation, use or adaptation of the present application that follows the general principles of the present application and includes common general knowledge or conventional technical means in the field of technology not disclosed in the present application. Specifications and embodiments are to be regarded as exemplary only, and the true scope and spirit of the present application are indicated by the claims below.

It should be understood that the present application is not limited to the precise structure already described above and shown in the appended drawings, and various modifications and changes may be made without deviating from its scope. The scope of the present application is limited only by the appended claims.

What is claimed is:

1. A method for controlling a device based on tapping, comprising:

in response to a tapping action from a user, acquiring sound information triggered by the tapping action;

performing recognition processing on the sound information according to a preset recognition model set to determine a recognition result of the sound information, wherein the recognition model set comprises at least one recognition model;

controlling the device according to the recognition result, wherein the performing recognition processing on the sound information according to a preset recognition model set to determine a recognition result of the sound information comprises:

determining tapping dimension information of the sound information;

determining a corresponding recognition model according to the tapping dimension information of the sound information, and performing recognition processing on the sound information according to each recognition model to determine a classification recognition result of the sound information by each recognition model, wherein the sound information corresponds to at least one recognition model, and each recognition model corresponds to at least one tapping dimension information; and performing merging processing on each classification recognition result to determine the recognition result of the sound information.

2. The method according to claim 1, wherein the performing recognition processing on the sound information according to each recognition model to determine a classification recognition result of the sound information by each recognition model comprises:

performing recognition processing on the sound information according to each recognition model to determine a confidence rate of the sound information under each recognition model, wherein the confidence rate represents a probability of the sound information being recognized by a recognition model;

if the confidence rate is greater than or equal to a preset threshold, determining a classification recognition result of the sound information from the corresponding recognition model to be that the sound information passes recognition;

if the confidence rate is less than a preset threshold, determining a classification recognition result of the sound information from the corresponding recognition model to be that the sound information does not pass recognition.

3. The method according to claim 1, wherein the tapping dimension information comprises one or more of tapping frequency information, tapping force information, tapping position information, information about a driving distance of tapping and information about a contact area of tapping.

4. The method according to claim 1, wherein the controlling the device according to the recognition result comprises:

if the recognition result indicates that the sound information does not pass a recognition by any recognition model, controlling the device to output prompting information, wherein the prompting information is used for prompting the user to reenter a tapping action;

if the recognition result indicates that the sound information passes a recognition by one or more recognition models, outputting a control instruction according to the recognition result, and controlling the device to execute the corresponding control instruction, wherein the control instruction is used for controlling the device to perform one or more of starting up, shutting down, intelligent interaction, door opening and door closing.

5. The method according to claim 1, wherein the method further comprises:

acquiring multi-dimensional training audio information, wherein the multi-dimensional training audio information comprises audio information at different tapping positions, audio information over different tapping frequencies, audio information under different tapping forces, audio information for different driving distances of tapping and audio information for different contact areas of tapping;

conducting classification model training for the multi-dimensional training audio information according to a preset neural network model to determine the recognition model set, wherein different recognition models have different recognition dimensions.

6. The method according to claim 1, wherein the method further comprises:

acquiring multi-dimensional training audio information, wherein the multi-dimensional training audio information comprises audio information at different tapping positions, audio information over different tapping frequencies, audio information under different tapping forces, audio information for different driving distances of tapping and audio information for different contact areas of tapping;

conducting classification model training for the multi-dimensional training audio information according to a preset neural network model to determine the recognition model set, wherein different recognition models have different recognition dimensions.

7. The method according to claim 2, wherein the method further comprises:

acquiring multi-dimensional training audio information, wherein the multi-dimensional training audio information comprises audio information at different tapping positions, audio information over different tapping frequencies, audio information under different tapping forces, audio information for different driving distances of tapping and audio information for different contact areas of tapping;

conducting classification model training for the multi-dimensional training audio information according to a preset neural network model to determine the recognition model set, wherein different recognition models have different recognition dimensions.

8. The method according to claim 3, wherein the method further comprises:

acquiring multi-dimensional training audio information, wherein the multi-dimensional training audio information comprises audio information at different tapping positions, audio information over different tapping frequencies, audio information under different tapping forces, audio information for different driving distances of tapping and audio information for different contact areas of tapping;

conducting classification model training for the multi-dimensional training audio information according to a preset neural network model to determine the recognition model set, wherein different recognition models have different recognition dimensions.

9. The method according to claim 4, wherein the method further comprises:

acquiring multi-dimensional training audio information, wherein the multi-dimensional training audio information comprises audio information at different tapping positions, audio information over different tapping frequencies, audio information under different tapping forces, audio information for different driving distances of tapping and audio information for different contact areas of tapping;

conducting classification model training for the multi-dimensional training audio information according to a preset neural network model to determine the recognition model set, wherein different recognition models have different recognition dimensions.

10. An electronic device, comprising:

at least one processor; and a memory communicatively connected with the at least one processor;

wherein the memory stores an instruction executable by the at least one processor, and the instruction is executed by the at least one processor to enable the at least one processor to:

acquire sound information triggered by a tapping action in response to the tapping action from a user;

perform recognition processing on the sound information according to a preset recognition model set to determine a recognition result of the sound information, wherein the recognition model set comprises at least one recognition model;

control the device according to the recognition result, wherein the at least one processor is specifically enabled to:

determine tapping dimension information of the sound information;

determine a corresponding recognition model according to the tapping dimension information of the sound information, and perform recognition processing on the sound information according to each recognition model to determine a classification recognition result of the sound information by each recognition model, wherein the sound information corresponds to at least one recognition model, and each recognition model corresponds to at least one tapping dimension information; and perform merging processing on each classification recognition result to determine the recognition result of the sound information.

11. The electronic device according to claim 10, wherein the at least one processor is enabled to:

perform recognition processing on the sound information according to each recognition model to determine a confidence rate of the sound information under each recognition model, wherein the confidence rate represents a probability of the sound information being recognized by a recognition model;

if the confidence rate is greater than or equal to a preset threshold, determine a classification recognition result of the sound information from the corresponding recognition model to be that the sound information passes recognition;

if the confidence rate is less than a preset threshold, determine a classification recognition result of the sound information from the corresponding recognition model to be that the sound information does not pass recognition.

12. The electronic device according to claim 10, wherein the tapping dimension information comprises one or more of tapping frequency information, tapping force information, tapping position information, information about a driving distance of tapping and information about a contact area of tapping.

13. The electronic device according to claim 10, wherein the at least one processor is enabled to:

if the recognition result indicates that the sound information does not pass a recognition by any recognition model, control the device to output prompting information, wherein the prompting information is used for prompting the user to reenter a tapping action;

if the recognition result indicates that the sound information passes a recognition by one or more recognition models, output a control instruction according to the recognition result, and control the device to execute the corresponding control instruction, wherein the control instruction is used for controlling the device to perform one or more of starting up, shutting down, intelligent interaction, door opening and door closing.

14. The electronic device according to claim 10, wherein the at least one processor is enabled to:

acquire multi-dimensional training audio information, wherein the multi-dimensional training audio information comprises audio information at different tapping positions, audio information over different tapping frequencies, audio information under different tapping forces, audio information for different driving distances of tapping and audio information for different contact areas of tapping;

conduct classification model training for the multi-dimensional training audio information according to a preset neural network model to determine the recognition model set, wherein different recognition models have different recognition dimensions.

15. The electronic device according to claim 10, wherein the at least one processor is enabled to:

acquire multi-dimensional training audio information, wherein the multi-dimensional training audio information comprises audio information at different tapping positions, audio information over different tapping frequencies, audio information under different tapping forces, audio information for different driving distances of tapping and audio information for different contact areas of tapping;

conduct classification model training for the multi-dimensional training audio information according to a preset neural network model to determine the recognition model set, wherein different recognition models have different recognition dimensions.

16. The electronic device according to claim 11, wherein the at least one processor is enabled to:

acquire multi-dimensional training audio information, wherein the multi-dimensional training audio information comprises audio information at different tapping positions, audio information over different tapping frequencies, audio information under different tapping forces, audio information for different driving distances of tapping and audio information for different contact areas of tapping;

conduct classification model training for the multi-dimensional training audio information according to a preset neural network model to determine the recognition model set, wherein different recognition models have different recognition dimensions.

17. The electronic device according to claim 12, wherein the at least one processor is enabled to:

acquire multi-dimensional training audio information, wherein the multi-dimensional training audio information comprises audio information at different tapping positions, audio information over different tapping frequencies, audio information under different tapping forces, audio information for different driving distances of tapping and audio information for different contact areas of tapping;

conduct classification model training for the multi-dimensional training audio information according to a preset neural network model to determine the recognition model set, wherein different recognition models have different recognition dimensions.

18. A non-transitory computer readable storage medium, wherein the computer readable storage medium is stored with a computer executable instruction, wherein when the computer executable instruction is executed by a processor to:

acquire sound information triggered by a tapping action in response to the tapping action from a user;

perform recognition processing on the sound information according to a preset recognition model set to determine a recognition result of the sound information, wherein the recognition model set comprises at least one recognition model;

control the device according to the recognition result, wherein the processor is specifically enabled to:

determine tapping dimension information of the sound information;

determine a corresponding recognition model according to the tapping dimension information of the sound information, and perform recognition processing on the sound information according to each recognition model to determine a classification recognition result of the sound information by each recognition model, wherein the sound information corresponds to at least one recognition model, and each recognition model corresponds to at least one tapping dimension information; and perform merging processing on each classification recognition result to determine the recognition result of the sound information.

\* \* \* \* \*